United States Patent
Racz et al.

(10) Patent No.: US 8,284,667 B2
(45) Date of Patent: *Oct. 9, 2012

(54) EFFICIENT FLOW CONTROL IN A RADIO NETWORK CONTROLLER (RNC)

(75) Inventors: Sandor Racz, Cegled (HU); Peter Lundh, Skarholmen (SE); Szilveszter Nadas, Budapest (HU); Zoltan Nagy C, Szeged (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 243 days.

This patent is subject to a terminal disclaimer.

(21) Appl. No.: 12/682,138

(22) PCT Filed: Oct. 29, 2008

(86) PCT No.: PCT/SE2008/051232
§ 371 (c)(1),
(2), (4) Date: Apr. 8, 2010

(87) PCT Pub. No.: WO2009/058084
PCT Pub. Date: May 7, 2009

(65) Prior Publication Data
US 2010/0220594 A1   Sep. 2, 2010

Related U.S. Application Data

(60) Provisional application No. 60/984,445, filed on Nov. 1, 2007.

(51) Int. Cl.
*H04J 1/16* (2006.01)
(52) U.S. Cl. ........................................ 370/235; 370/338

(58) Field of Classification Search ................. 370/216, 370/230–235, 241–252, 328, 338
See application file for complete search history.

(56) References Cited

U.S. PATENT DOCUMENTS

| | | | |
|---|---|---|---|
| 2004/0120306 A1 | 6/2004 | Wigard et al. | |
| 2005/0141443 A1* | 6/2005 | Kim et al. | 370/312 |
| 2006/0268689 A1* | 11/2006 | Tarraf et al. | 370/229 |
| 2007/0153695 A1* | 7/2007 | Gholmieh et al. | 370/235 |
| 2010/0203893 A1* | 8/2010 | Lundh et al. | 455/445 |
| 2010/0238803 A1* | 9/2010 | Racz et al. | 370/235 |

FOREIGN PATENT DOCUMENTS

| | | |
|---|---|---|
| EP | 1 511 214 A2 | 3/2005 |
| WO | WO 03/049320 A1 | 6/2003 |

OTHER PUBLICATIONS

International Search Report dated Mar. 6, 2009 (4 pages).
Written Opinion dated Mar. 6, 2009 (7 pages).
3GPP TS 25.427 V6.6.0 (Mar. 2006); $3^{rd}$ Generation Partnership Project; Technical Specification Group Radio Access Network, UTRAN Iub/Iur interface user plane protocol for DCH data streams, Release 6, pp. 1-41.

* cited by examiner

*Primary Examiner* — Ricky Ngo
*Assistant Examiner* — Kan Yuen
(74) *Attorney, Agent, or Firm* — Myers Bigel Sibley & Sajovec, PA (57) ABSTRACT

In one aspect, a mechanism is provided to resolve the Iub transport network congestion in the uplink direction by using the transmission window of the RLC to control the transfer rate of the flow. The RNC (110) detects the Iub TN congestion for the flow in the uplink. The EUL flow control running in the RNC (110) calculates the RLC transmission window size for the UE for the flow and the calculated RLC transmission window size is signaled to the peer RLC entity in the UE (130) through an RLC STATUS PDU.

16 Claims, 6 Drawing Sheets

EFFICIENT FLOW CONTROL IN A RADIO NETWORK CONTROLLER (RNC)

TECHNICAL FIELD

The disclosed technology relates to promoting efficient Enhanced Uplink flow control in a wireless network.

BACKGROUND

As the demand grows for higher throughput, i.e., higher bit rate, and more efficient transmission of packet data over wireless networks, the 3$^{rd}$ Generation Partnership Project (3GPP) has extended its specifications with the High Speed Downlink Packet Access (HSDPA) for transfer of packetized data in the downlink direction—from the radio network controller (RNC) to the radio base station (Node-B) and eventually to the user equipment (UE). HSDPA's main goal is to enhance network capacity through increased accessibility, increased throughput, and reduced latency in the downlink direction.

In the uplink direction—from the UE to the Node-B, the 3GPP has also extended its specifications with Enhanced Uplink (EUL). EUL provides features that make it faster than earlier uplink operations such as those in Release '99. The new features include multi-code transmission, short transmission time interval (TTI), fast hybrid automatic repeat request (HARQ), and fast scheduling.

Figure 1:
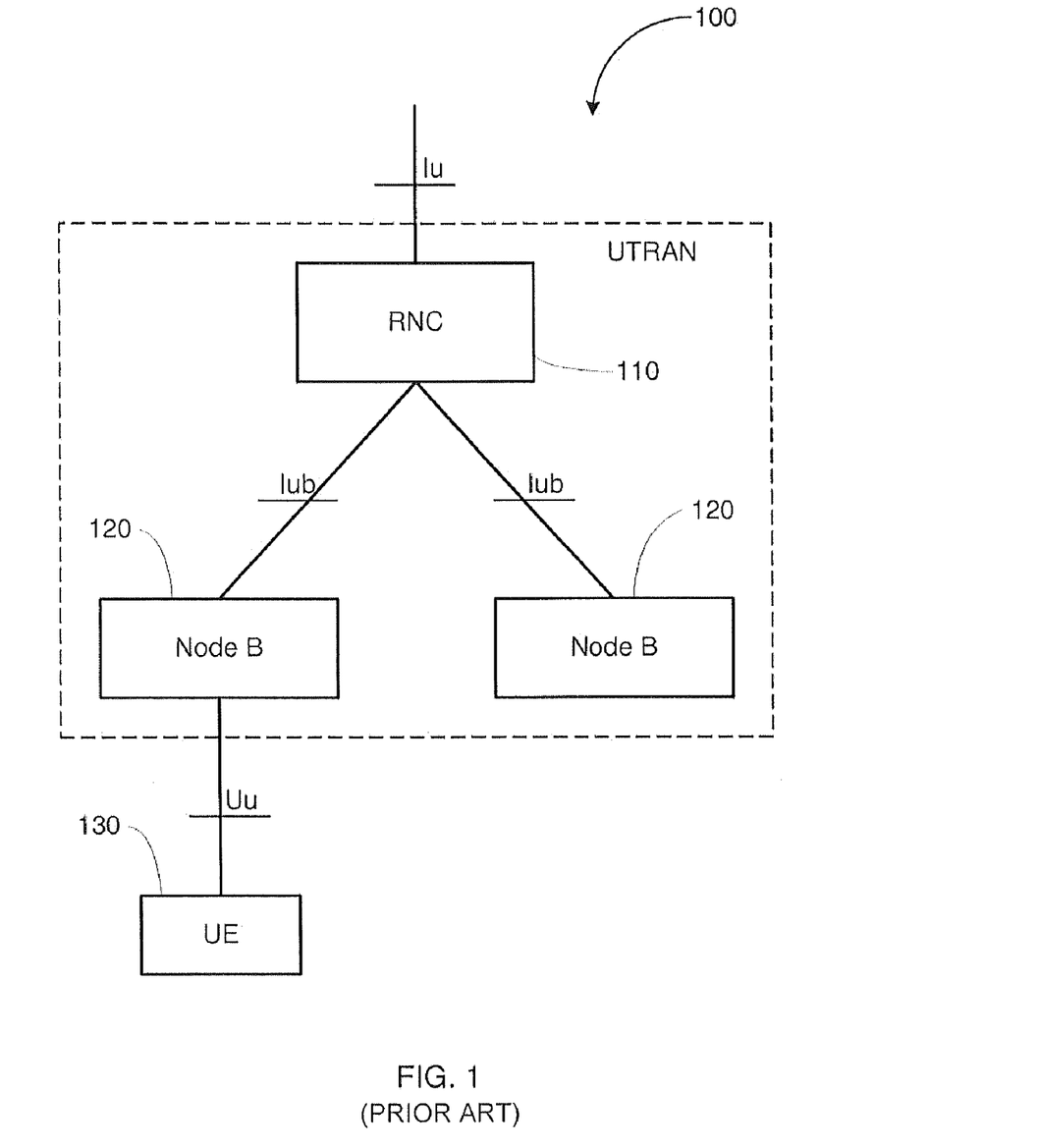
FIG. 1 illustrates an example wireless network system.

FIG. 1 illustrates an example UTRAN system 100. The system 100 includes an RNC 110 communicating with the core network (not illustrated) over an Iu interface. The system also includes multiple Node-Bs 120 connected to the RNC 110 over Iub interfaces. The user equipments (UE) 130, typically mobile terminals, communicate with one or more Node-Bs 120 over a Uu interface (radio link).

Figure 2:
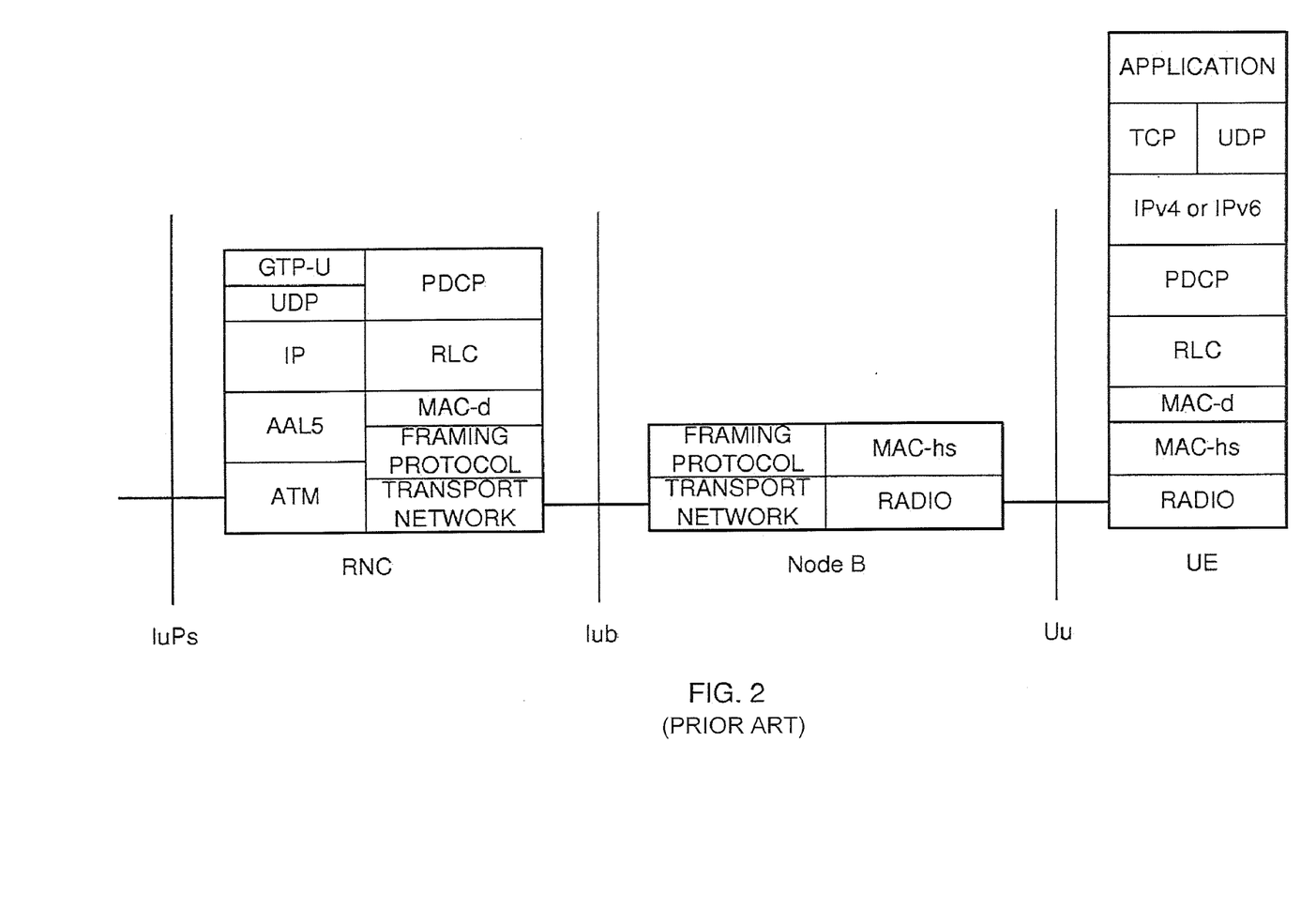
FIG. 2 illustrates protocol layers and the nodes involved in EUL.

The protocol layers and the nodes involved in data exchange between the RNC and the UE are illustrated in FIG. 2. The RLC (radio link control) layer of the RNC provides RLC protocol data units (PDU) to the peer RLC layer in the UE in the downlink direction. Conversely, in the uplink direction, the RLC layer in the UE sends RLC PDUs to the RLC layer in the UE. The RLC PDUs are packaged in Medium Access Control-d (MAC-d) PDUs, and these MAC-d PDUs are exchanged between the RNC and the UE through the Node-B.

Data transmission bottlenecks can occur in both the uplink and the downlink directions. The bottlenecks can also occur on the Iub interface between the Node-B and the RNC and on the Uu interface between the Node-B and the UE. Flow control is needed to handle the congestion situations.

For the uplink, the frame work for EUL Flow Control (FC) is standardized in 3GPP. In the document 3GPP TS 25.427 V6.6.0 (2006-03), "UTRAN Iub/Iur interface user plane protocol for DCH data streams", the E-DCH (enhanced dedicated transport channel) DATA FRAME (DF) and the TNL Congestion Indication (TCI) Control Frame (CF) are defined. Based on the E-DCH DATA FRAME sequence received from the Node-B, the RNC can detect TNL (transport network layer) congestion and can indicate different type of congestions to the RBS using the TCI CF. On a transport bearer carrying an E-DCH MAC-d flow, the RNC can detect a congestion situation occurring on the Iub interface. Upon detection of the congestion situation, the RNC can notify the Node-B of the congestion through the TCI CF.

Upon reception of the TCI CF, the Node-B reduces the bit rate on the Iub interface for the E-DCH MAC-d flow. Practically, when there is congestion in the uplink of the MAC-d flow, the existing Uu scheduler controls the bit rate to resolve the congestion. Bit rate control can lead to long reaction times to changing congestion conditions, which can lead to increased latency.

SUMMARY

In one aspect, a mechanism is provided to resolve the Iub transport (TN) network congestion in the uplink direction by using the transmission window of the RLC to control the transfer rate of a flow of data, e.g., flow of RLC PDUs, from the UE to the RNC. The RNC detects the Iub TN congestion for the flow. The EUL flow control running in the RNC calculates the RLC transmission window size for the UE for the flow when the congestion is detected and the calculated RLC transmission window size is signaled to the peer RLC entity in the UE.

In an embodiment, the RNC includes an Iub congestion detection part and an EUL FC part. The Iub congestion detection part detects the Iub TN congestion for the flow in the uplink direction. The Iub congestion detection part can be at the framing protocol level in the RNC. The EUL FC part reacts to the detection of the Iub TN congestion coming from the Iub congestion detection part. The EUL FC calculates a new RLC transmission window size for the UE and sends the information to the RLC entity in the UE through the RLC STATUS PDU.

The transmission window limits the number of unacknowledged RLC PDUs. When the congestion in the uplink is detected, the RLC transmission window size of the UE is reduced. The amount of reduction depends on the type of congestion detected. If successful RLC PDU transfers occur or a given amount of time passes without detecting any congestion, then the RLC transmission window size of the UE can be increased.

The window based solution can be implemented in the existing architecture. Also, no modification is required in the protocol architecture for either the Node-B or the UE. Further, interaction with the existing Uu scheduler in the Node-B is not required. Yet further, the congestion control is independent of the transport network. Only the congestion detection depends on the applied Iub TN (such as ATM or IP).

DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope.

In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

In the architecture illustrated in FIG. 2, the RLC layer in the UE generates RLC PDUs to be sent to the peer RLC layer in the RNC. The RLC layer provides the RLC PDUs to the MAC layer. The MAC layer is split between the RNC and the Node-B. MAC PDUs generated by the UE (associated with the RLC PDUs), called MAC-d PDUs, are sent to the Node-B over the Uu interface. The Node-B buffers and transmits the MAC-d PDUs to the RNC over the Iub interface.

In an aspect, a data flow (or simply flow) can be viewed as the flow of the RLC PDUs, which are associated with the MAC-d PDUs, from the RLC layer between the UE and the RNC via the Node-B. From another perspective, the flows can be viewed as the flows of the MAC-d PDUs between the RNC and the UE.

In 3GPP, the RLC layers in the UE and the RNC can operate in Acknowledged Mode (AM). The RLC in AM can be used to compensate for HARQ failures in the lower layers such as the MAC layer. In RLC AM, the receiver acknowledges the receipt of the RLC PDUs by sending an RLC PDU ACK message to the sender. In the uplink direction, the RNC is the receiver and the UE is the sender.

When operating the RLC in AM, the sender retransmits all RLC PDUs that are lost. The loss could have occurred over the Iub TN or the Uu. Packet losses and the resulting RLC retransmissions significantly increases the delay variation. Thus, it is desirable to minimize the packet losses and the RLC retransmission.

One cause for the sender to retransmit the RLC PDUs is when the bottleneck occurs, over either the Iub TN or the Uu since the congestion can cause the RLC PDUs to be lost or delayed significantly. There are existing solutions to address the congestion issue. In the existing solutions: 1) The TN congestion is not considered at all (it is assumed that the TN cannot be the bottleneck); or 2) The TN congestion is handled by the Uu scheduler in the Node-B. When the Uu scheduler receives the TCI CF indicating that congestion has been detected by the RNC, the scheduler reduces the bit rate of the flow.

There are disadvantages to the existing solutions. In the first solution, the TN network must be over-provisioned to avoid the TN congestion. This can lead to serious performance degradation. In the second solution, the complexity of the Uu scheduler is increased with functionalities that are not related to the Uu part of the system.

However, the RLC itself has the ability to resolve congestion. In one aspect, the RLC transmission window is used to control the data rate of the flow. The transmission window size of the RLC of the sender is adjusted based on the congestion status of the Iub TN. The RLC transmission window limits the number of unacknowledged RLC PDUs as noted before. That is, when the RLC transmission window size is set for the UE, it sets a maximum amount of outstanding data for the flow that can be transmitted from the UE to the RNC in one or more RLC PDUs until an acknowledgment (ACK) is sent from the RNC.

When the congestion occurs, the RLC transmission window size is decreased. In this way, the data rate, i.e., the bit rate, of the flow is reduced. When there is no congestion, then the RLC transmission window size can be increased.

Different types of congestion are distinguished and the reactions to the types of congestion can differ. For example, for a "loss" in the Iub TN, e.g., loss of E-DCH data frames carrying the MAC-d PDUs from the Node-B to the RNC, the RLC transmission window size of the UE can be reduced by relatively a large amount. For a "delay build-up" congestion, i.e., a delay in the transfer of the E-DCH data frames, the RLC transmission window size can be reduced by relatively a small amount.

For the uplink, the RNC detects the Iub TN congestion for the flow. The RNC calculates the RLC transmission window size for the UE for the flow upon congestion detection, and the calculated RLC transmission window size is signaled to the RLC entity in the UE through the RLC STATUS PDU. One advantage is that there is no need to modify the existing RLC protocol.

An example proposed solution to handle congestion includes the following parts in the RNC:
  Iub TN congestion detection, for example, at the Framing Protocol level in RNC. This part detects transport network congestion (i.e. Iub TN congestion).
  EUL FC in RNC. This part reacts on the Iub TN congestion coming from Iub congestion detection in RNC. After the calculation of the new transmission window size, it sends this information to the RLC entity in the UE through the RLC STATUS PDU.

Figure 3A:
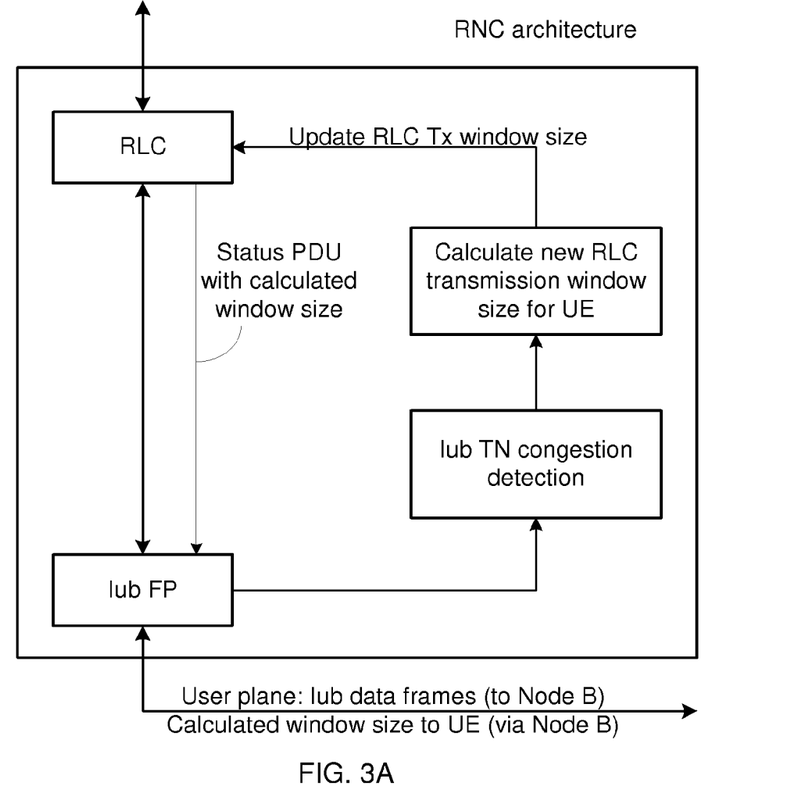
FIG. 3A illustrates an embodiment of an architecture of an RNC that includes an RLC with transmission window size support for Iub TN congestion handling.

FIG. 3A illustrates an embodiment of an architecture of the RNC that includes the RLC with transmission window size support for Iub TN congestion handling that includes the two parts described above.

Figure 3B:
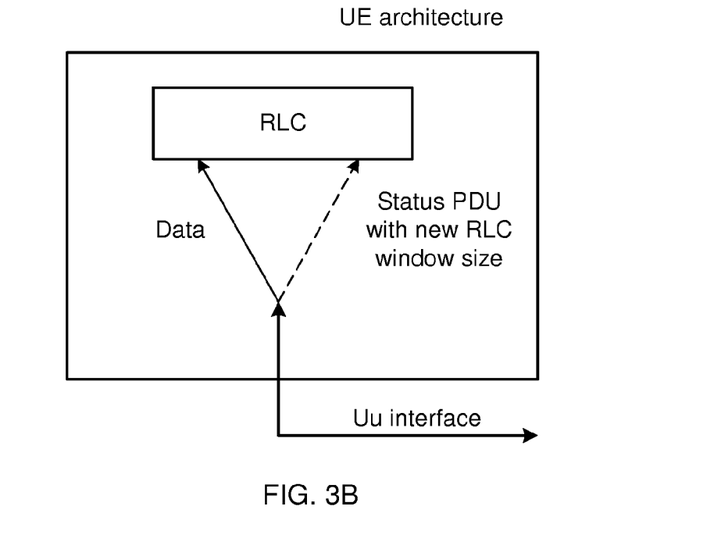
FIG. 3B illustrates an embodiment of an architecture of a UE for handling RLC STATUS PDU messages.

FIG. 3B illustrates an architecture of the UE. The RLC entity in the UE is not modified from the existing protocol.

FIG. 3B is provided simply to illustrate that the RLC entity within the UE, upon receipt of the RLC STATUS PDU with the window size specified therein, modifies its RLC transmission window size according to the standardized protocol.

Figure 4:
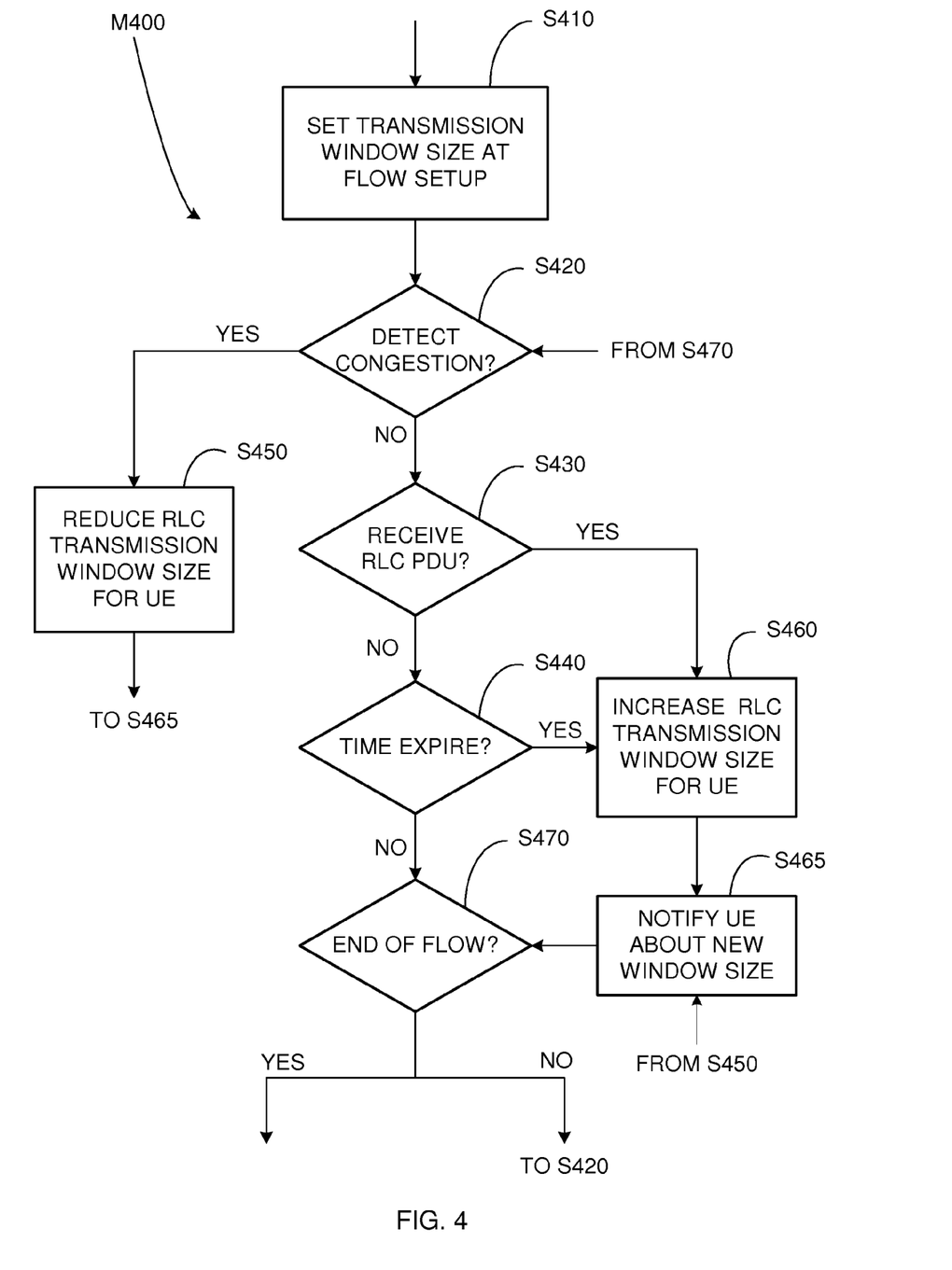
FIG. 4 illustrates an example method to operate the RNC to adapt the RLC transmission window size for a flow of RLC PDUs in the uplink.

FIG. 4 illustrates an example method M400 to operate the RNC to adapt the RLC transmission window size for a flow of RLC PDUs in the uplink direction. Here, it is assumed that the RNC is able to exchange RLC PDUs with the UE through the Node-B. More specifically, the RLC entity (unit) implementing the RLC layer in the RNC exchanges the RLC PDUs with the peer RLC entity in the UE.

In step S410, the RLC transmission window size for the UE for the flow is set at initial flow set up. In one embodiment, the RLC unit that is arranged to implement the RLC functionalities may perform the initial set up and determine the initial RLC transmission window size. In another embodiment, the Node-B itself can make the initial determination when the radio link with the UE is first configured. In yet another embodiment, a slow-start phase may be used. For example, for every acknowledged RLC PDU, the size of the RLC transmission window can be increased by one RLC PDU.

In step S420, the RNC determines whether a congestion exists on the Iub TN connection between the RNC and the Node-B for the flow. If the congestion on the Iub TN is detected, the RNC reduces the RLC transmission window size for the UE in step S450.

Figure 5:
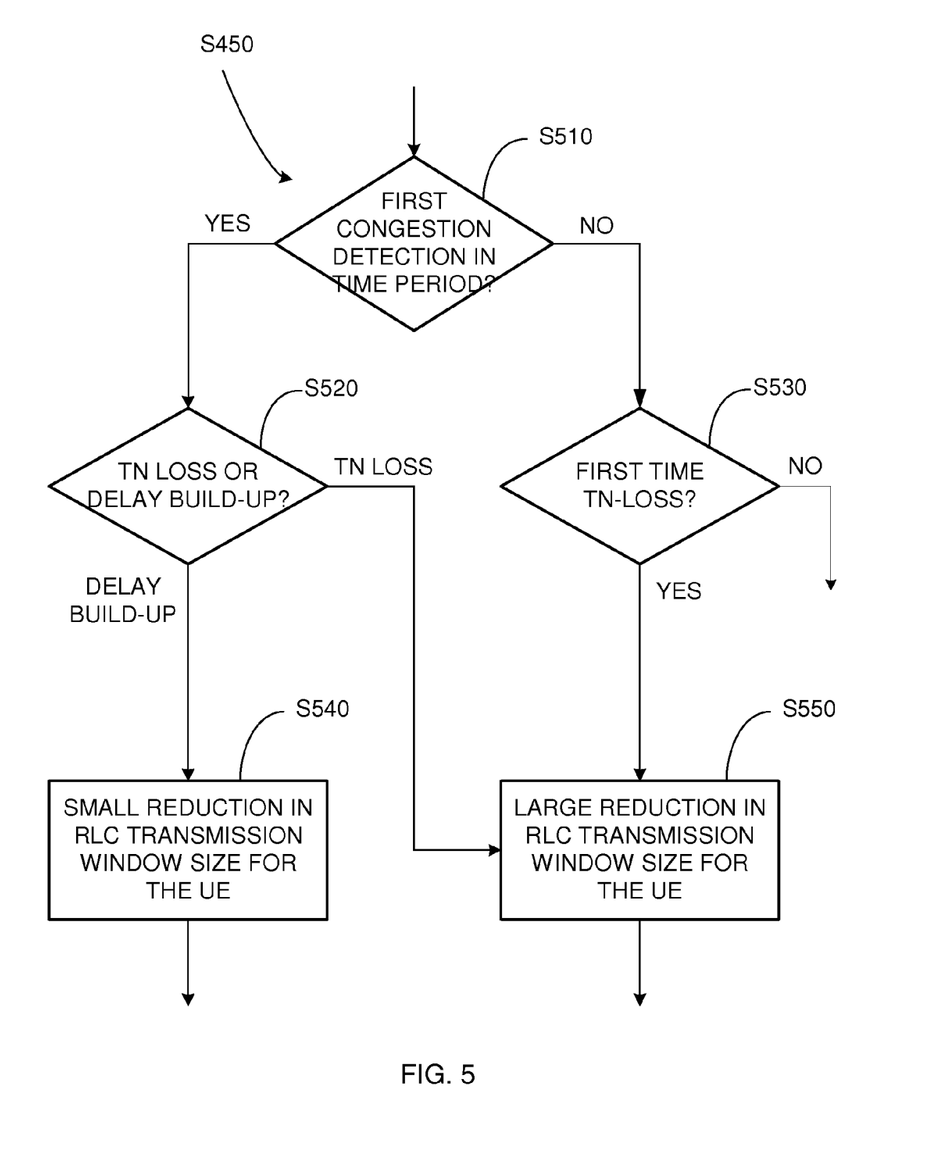
FIG. 5 illustrates an example process to determine reduction of RLC transmission size for a UE.

FIG. 5 illustrates an example process to implement the step S450. In step S510, the RNC determines whether the congestion is a first congestion detected within a predetermined time period. Here, the predetermined time period can be viewed as a time period since the initial flow set up or since an expiration of a previous measurement time period, whichever came last.

If the congestion is the first detected congestion within the predetermined time period, then in step S520, the RNC determines whether the congestion is a delay build-up congestion or a TN loss congestion. The delay build-up congestion can indicate that there is a delay in a transfer of E-DCH data frames carrying the MAC-d PDUs for the flow from the Node-B to the RNC. The TN loss congestion can indicate that one or more E-DCH data frames for the flow have been dropped.

If the congestion is the delay build-up congestion, then the RLC transmission window size for the UE is reduced by a first amount in step S540. If congestion is the delay build-up type, then in step S550, the RLC transmission window size is reduced by a second amount which is larger than the first amount. That is, the amount of reduction depends on the congestion type, and preferably, there is a larger reduction when the TN loss congestion occurs than when the delay build-up congestion occurs.

In one embodiment, the first and second amounts may be fixed. In another embodiment, the first and second amounts can be a fixed multiplication factor applied to the current RLC transmission size. For example, when the delay build-up or the TN loss congestion is encountered, the current RLC transmission window size for the UE can be multiplied by a first factor f1 or a second factor f2, respectively. In this case, the relationship 0<f1<f2<1 should hold true.

By determining whether or not this is the first congestion occurrence within the predetermined time period and acting on the first occurrence only, even if multiple congestions are detected within the given time period, very frequent adjustments to the RLC transmission window size can be prevented.

However, there may be an instance in which it is desirable to react to the subsequent congestion detection within the given predetermined time period. More specifically, for a first occurrence of the TN loss congestion since the initial flow set up, it is preferred that the RLC transmission window size be reduced accordingly. This is reflected in steps S510, S530, and S550.

Note that it may be desirable to maintain a minimum RLC transmission window size so that extremely low window size is avoided. Thus, in an embodiment, if the reduction in the RLC transmission window size results in a window size that is below a predetermined minimum window size, then the RLC transmission window size is set to be no less than the predetermined minimum window size.

Note that in step S450, and more specifically in steps S540 and S550, the RNC determines how much the RLC transmission window size for the UE should be reduced, but the actual setting of the RLC transmission window size is not performed in the RNC. Instead, the RNC notifies the UE regarding the reduced RLC transmission window size in step S465 as shown in FIG. 4.

In one embodiment, to notify the UE regarding the reduction in the RLC transmission window size, the RNC first forms an RLC STATUS PDU with the reduced RLC transmission window size specified therein. The RNC then sends the RLC STATUS PDU to the UE. The UE, upon receipt of the RLC STATUS PDU message, updates its RLC transmission window size for the flow.

While congestion indicates that the RLC transmission size for the UE should be decreased to thereby decrease throughput of the flow, other situations can indicate that the RLC transmission size can be increased to correspondingly increase the throughput. Referring back to FIG. 4, in step S430, the RNC determines if one or more RLC PDUs sent from the UE has been received properly. If so, this can be an indication that the transport links between the RNC and the UE can handle higher throughput. Thus, when it is determined that the RLC PDUs have been received properly, the RNC can increase the RLC transmission size for the UE in step S460.

Again, the RNC determines how much the RLC transmission window size in the UE should be increased in step S460, but does not perform the actual setting. Instead, the RNC notifies the UE regarding the increased RLC transmission window size in step S465. The RNC may notify the UE by forming and sending the RLC STATUS PDU with the increased window size specified therein.

Another indication that the that the transport links between the RNC and the UE can handle higher throughput is when no congestion is detected in the Iub TN within a given predetermined amount of time. This is reflected in step S440 in which the RNC determines whether or not a predetermined amount of time has passed since the initial data flow set up or since an expiration of a previous measurement time period, whichever came last, without having detected any congestion. When no congestion is detected, the RNC can increase the RLC transmission window size for the UE in step S460 and notify the UE in step S465. While not explicitly shown, it can be assumed that the timer, upon expiration in step S460, is reset.

It is preferred to not to let the RLC transmission window size for the UE to become too big. Thus, in an embodiment, the RLC transmission window size is set to be no more than a predetermined maximum window size when it is increased.

One practical effect is that by setting the RLC transmission window size (either increase or decrease), a maximum amount of outstanding data is set for the flow that can be transmitted from the UE to the RNC in one or more RLC PDUs until an acknowledgment (ACK) is sent from the RNC.

Figure 6:
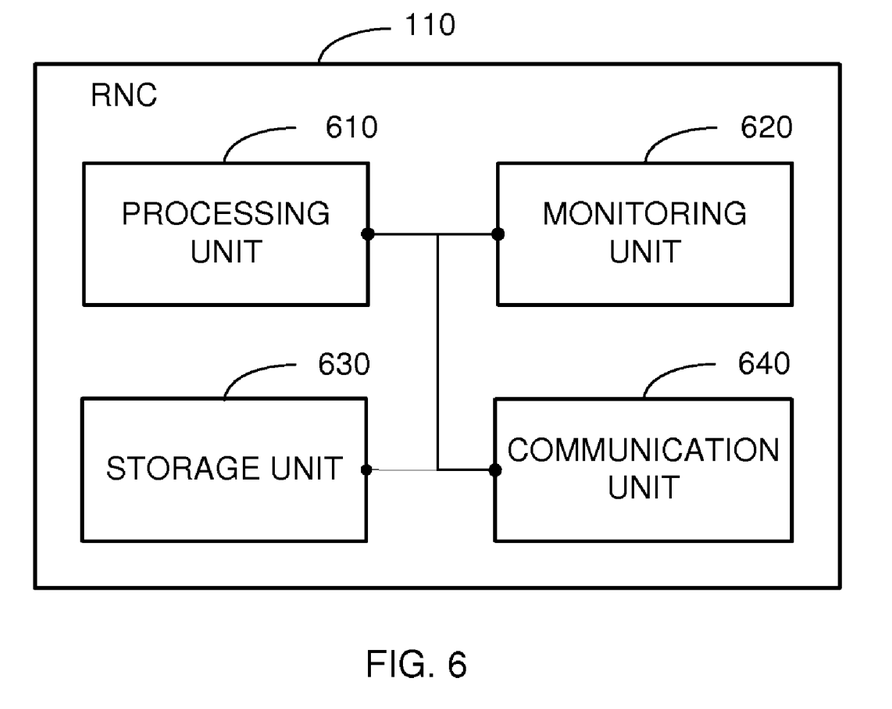
FIG. 6 illustrates an embodiment of the RNC.

FIG. 6 illustrates an example embodiment of the RNC arranged to implement the methods described above. The RNC includes a processing unit 610, a monitoring unit 620, a storage unit 630, and a communication unit 640. The processing unit 610 is arranged to control the overall operations of the RNC including coordinating and controlling the other units 620-640 to perform the methods.

The monitoring unit 620 is arranged to monitor statuses of the RNC including monitoring the data traffic conditions on communication links between the RNC and the Node-B such as the Iub TN. The storage unit 630 is arranged to store information necessary for proper functioning of the RNC 110 including storing data and control information for the data flow between the RNC and the UE. The storage unit 630 can be used to buffer the RLC PDUs, MAC PDUs, etc. to implement the protocol architecture. The communication unit 640 is arranged to communicate with the UE through the Node-B including exchanging RLC PDUs, packaged in corresponding MAC-d PDUs. The communication with the Node-B can occur over the Iub TN.

The units 610-640 are illustrated as separate units in FIG. 6. However, this is merely to indicate that the functionalities are separated. The units can be provided as separate hardware devices. However, other configurations are possible. Any combination of the units can be implemented in any combination of software, hardware, and/or firmware.

The advantages of the one or more disclosed embodiments are numerous. The advantages include at least the following:
The proposed solution(s) can be implemented in the existing architecture.
No modification is required in the protocol architecture for either the Node-B or the UE.
Interaction with the existing Uu scheduler in the Node-B is not required.
Congestion control is independent of the transport network. Only the congestion detection depends on the applied Iub TN (such as ATM or IP).

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby. Furthermore, no element, component, or method act in the present disclosure is intended to be dedicated to the public.

What is claimed is:

1. A method for operating a radio network controller (RNC) in a wireless network, the RNC being in communication with a user equipment (UE), the method comprising:
setting a radio link control (RLC) transmission window size for the UE for a flow at initial data flow set up;
determining whether a congestion exists on an hub transport network (TN) connection between the RNC and a Node B for the flow in an uplink direction;
reducing the RLC transmission window size when the congestion exists; and
notifying the UE regarding the reduced RLC transmission window size,
where the flow is a flow of Medium Access Control-d Protocol Data Units (MAC-d PDUs) formed from RLC PDUs exchanged between the RNC and the UE, and
where the RLC transmission window size sets a maximum amount of outstanding data for the flow that can be transmitted from the UE to the RNC in one or more RLC PDUs until an acknowledgment (ACK) is sent from the RNC.

2. The method of claim 1, where the notifying the UE comprises:
forming and sending an RLC STATUS PDU with the reduced RLC transmission window size specified therein to the UE.

3. The method of claim 1, where the reducing the RLC transmission window size comprises:
determining whether the congestion is a first congestion detected within a predetermined time period; and
reducing the RLC transmission window size when the congestion is the first congestion,
where the predetermined time period is a time period that has passed since the initial data flow set up for the UE or since an expiration of a previous measurement time period, whichever came last.

4. The method of claim 3, where in the reducing the RLC transmission window size, when the congestion is the first congestion, an amount of reduction of the RLC transmission window size is based on a type of the congestion.

5. The method of claim 3, where the reducing the RLC transmission window size when the congestion is the first congestion comprises:
determining whether the congestion is a delay build-up congestion indicating a delay in a transfer of the flow from the Node-B to the RNC or a transport network (TN) loss congestion indicating loss of data in the transfer;
reducing the RLC transmission window size by a first reduction amount when the congestion is the delay build-up congestion; and
reducing the RLC transmission window size by a second reduction amount when the congestion is the TN loss congestion,
where the first amount is less than the second amount.

6. The method of claim 3, where the reducing the RLC transmission window size for the UE further comprises:
determining whether the congestion is a first occurrence of a TN loss congestion since the initial data flow set up; and
reducing the RLC transmission window size for the UE when the congestion is the first occurrence,
where the TN loss congestion indicates loss of data in a transfer of the flow from the Node-B to the RNC.

7. The method of claim 1, where the reducing the RLC transmission window size comprises:
setting the RLC transmission window size to be no less than a predetermined minimum window size.

8. The method of claim 1, further comprising:
determining whether an RLC PDU of the flow from the UE is properly received;
increasing the RLC transmission window size for the UE (440) when it is the RLC PDU from the UE is properly received; and
notifying the UE regarding the increased RLC transmission window size.

9. The method of claim 1, further comprising:
determining whether a predetermined amount of time has passed since the initial data flow set up or since an expiration of a previous measurement time period, whichever came last, without having detected any congestion;

increasing the RLC transmission window size when the predetermined determined amount of time has passed; and notifying the UE regarding the increased RLC transmission window size.

10. A radio network controller (RNC) in a wireless network, the RNC comprising:

a communication unit to exchange Radio Link Control Protocol Data Units (RLC PDUs) with a UE via a Node-B;

a monitoring unit to monitor data traffic conditions on communication links between the RNC and the Node-B;

a storage unit to store data and control information for a flow between the RNC and the UE; and a processing unit to control the communication unit, the monitoring unit, and the storage unit to perform communication operations for the RNC, where the processing unit is to:

set an RLC transmission window size for the UE for a flow at initial data flow set up;

determine whether a congestion exists on an Iub Transport Network (TN) connection between the RNC and the Node-B for the flow in an uplink direction;

reduce the RLC transmission window size when the congestion exists; and notify the regarding the reduced RLC transmission window size, where the flow is a flow of Medium Access Control-d Protocol Data Units (MAC-d PDUs) formed from RLC PDUs exchanged between the RNC and the UE, and where the RLC transmission window size sets a maximum amount of outstanding data for the flow that can be transmitted from the UE to the RNC in one or more RLC PDUs until an acknowledgment (ACK) is sent from the RNC.

11. The RNC of claim 10, where the processing unit is to form and send an RLC STATUS PDU with the reduced RLC transmission window size specified therein to notify the UE.

12. The RNC of claim 10, where the processing unit is to reduce the RLC transmission window size by:

determining whether the congestion is a first congestion detected within a predetermined time period; and reducing the RLC transmission window size when the congestion is the first congestion, where the predetermined time period is a time period that has passed since the initial data flow set up for the UE or since an expiration of a previous measurement time period, whichever came last.

13. The RNC of claim 12, where the processing unit is to reduce the RLC transmission window size when the congestion is the first congestion by:

determining whether the congestion is a delay build-up congestion indicating a delay in a transfer of the flow from the Node-B to the RNC or a transport network (TN) loss congestion indicating loss of data in the transfer;

reducing the RLC transmission window size by a first reduction amount when the congestion is the delay build-up congestion; and reducing the RLC transmission window size by a second reduction amount when the congestion is the TN loss congestion, where the first amount is less than the second amount.

14. The RNC of claim 12, where the processing unit is to reduce the RLC transmission window size by:

determining whether the congestion is a first occurrence of a TN loss congestion since the initial data flow set up; and reducing the RLC transmission window size for the UE when the congestion is the first occurrence, where the TN loss congestion indicates loss of data in a transfer of the flow from the Node-B to the RNC.

15. The RNC of claim 10, where the processing unit is to reduce the RLC transmission window size to no less than a predetermined minimum window size.

16. The RNC of claim 10, where the processing unit is to:

determine whether an RLC PDU of the flow from the UE is properly received;

increase the RLC transmission window size for the UE when the RLC PDU from the UE is properly received; and notify the UE regarding the increased RLC transmission window size.

* * * * *

UNITED STATES PATENT AND TRADEMARK OFFICE
CERTIFICATE OF CORRECTION

PATENT NO. : 8,284,667 B2
APPLICATION NO. : 12/682138
DATED : October 9, 2012
INVENTOR(S) : Rácz et al.

It is certified that error appears in the above-identified patent and that said Letters Patent is hereby corrected as shown below:

On the Title Page, in Item (12), under "United States Patent", in Column 1, Line 1, delete "Racz" and insert -- Rácz --, therefor.

On the Title Page, in Item (75), under "Inventors", in Column 1, Line 1, delete "Sandor Racz," and insert -- Sándor Rácz, --, therefor.

On the Title Page, in Item (75), under "Inventors", in Column 1, Line 1, delete "Cegled" and insert -- Cegléd --, therefor.

On the Title Page, in Item (75), under "Inventors", in Column 1, Line 2, delete "Skarholmen" and insert -- Skärholmen --, therefor.

On the Title Page, in Item (75), under "Inventors", in Column 1, Line 3, delete "Nadas," and insert -- Nádas, --, therefor.

On the Title Page, in Item (75), under "Inventors", in Column 1, Line 3, delete "Zoltan" and insert -- Zoltán --, therefor.

On the Title Page, in Item (56), under "OTHER PUBLICATIONS", in Column 2, Line 5, delete "lub/lur" and insert -- Iub/Iur --, therefor.

On the Title Page, in Item (56), under "OTHER PUBLICATIONS", in Column 2, Line 5, delete "streams," and insert -- streams; --, therefor.

On the Title Page, in Item (56), under "OTHER PUBLICATIONS", in Column 2, Line 6, delete "Release 6," and insert -- Release 6; --, therefor.

Signed and Sealed this
Sixteenth Day of April, 2013

Teresa Stanek Rea
*Acting Director of the United States Patent and Trademark Office*

CERTIFICATE OF CORRECTION (continued)
U.S. Pat. No. 8,284,667 B2

In the Specification:

In Column 2, Line 8, delete "transport (TN) network" and insert -- transport network (TN) --, therefor.

In Column 2, Line 41, delete "DESCRIPTION" and insert -- BRIEF DESCRIPTION --, therefor.

In the Claims:

In Column 7, Line 61, in Claim 1, delete "hub" and insert -- Iub --, therefor.

In Column 8, Lines 60-61, in Claim 8, delete "UE (440) when it is" and insert -- UE when --, therefor.